United States Patent
Ono

(10) Patent No.: US 7,348,898 B2
(45) Date of Patent: Mar. 25, 2008

(54) CAPACITIVE INPUT DEVICE

(75) Inventor: Shuzo Ono, Fukushime-ken (JP)

(73) Assignee: Alps Electric Co., Ltd, Tokyo (JP)

(*) Notice: Subject to any disclaimer, the term of this patent is extended or adjusted under 35 U.S.C. 154(b) by 278 days.

(21) Appl. No.: 11/305,810

(22) Filed: Dec. 15, 2005

(65) Prior Publication Data

US 2006/0132332 A1 Jun. 22, 2006

(30) Foreign Application Priority Data

Dec. 21, 2004 (JP) ............................ 2004-369008

(51) Int. Cl.
*H03M 11/00* (2006.01)
(52) U.S. Cl. .................. 341/33; 178/18.06; 200/600
(58) Field of Classification Search ................. 341/33; 200/5 A, 600; 178/18.06
See application file for complete search history.

(56) References Cited

U.S. PATENT DOCUMENTS

| 3,958,237 | A  | * | 5/1976  | Fulenwider ................ 341/1 |
| 6,704,005 | B2 | * | 3/2004  | Kato et al. ................ 345/173 |
| 7,166,813 | B2 | * | 1/2007  | Soma et al. ................ 200/600 |
| 7,242,393 | B2 | * | 7/2007  | Caldwell ................... 345/173 |
| 7,279,647 | B2 | * | 10/2007 | Philipp ..................... 200/5 R |
| 2004/0130527 | A1 |   | 7/2004 | Endo et al. |

* cited by examiner

*Primary Examiner*—Timothy Edwards, Jr.
(74) *Attorney, Agent, or Firm*—Brinks Hofer Gilson & Lione

(57) ABSTRACT

A input device is provided which includes a clock signal generator that generates a clock signal; a delay unit that has a capacitive sensor where an electrode is formed on a substrate; protective sheets each of which is formed of a dielectric and which are disposed on front and rear surfaces of the capacitive sensor; a logical product unit that transmits an output signal on the basis of a clock signal obtained from the clock signal generator and a delay signal obtained from the delay unit; and a controller that makes a predetermined program executed in accordance with an output signal obtained on the basis of the logical product unit.

10 Claims, 6 Drawing Sheets

CAPACITIVE INPUT DEVICE

BACKGROUND OF THE INVENTION

1. Field of the Invention

The present invention relates to an input device capable of performing an input through a front surface and a rear surface of a capacitive sensor so as to detect a variation of a capacitance, and, more particularly, to an input device suitable for a portable electronic apparatus which requires complicated input operation.

2. Description of the Related Art

Generally, an input unit, which has a capacitive sensor for detecting a variation of a capacitance, has been widely used in various electronic apparatuses. For example, it has been used as an input device for inputting information such as figures, characters or the like in electronic apparatuses such as a cellular phone, a PDA (personal digital assistant) which have been widely used in recent years.

In the input device, a substrate is generally disposed in which it has electrodes formed at an inner side of an input surface formed on a case of an electronic apparatus. In addition, in the input device, when a finger of an operator operating the corresponding electronic apparatus moves closely to or comes into contact with the input surface opposite to the electrode, a capacitance of the electrode varies, and an output signal according to the variation of the capacitance is obtained, which results in achieving input operation (for example, see JP-A-2004-201175).

However, as the electronic apparatus has become smaller in recent years, it has been required that the input device installed in the electronic apparatus becomes smaller. As a result, since the input surface of the input device becomes smaller, there is a problem in that operability of the input device becomes deteriorated. Specifically, an area of the input surface becomes smaller with decreasing size of the electronic apparatus and the input device while it is difficult for the sizes of the finger or pen operating the electronic apparatus to become smaller. For this reason, there is concern that the operator may erroneously operate a minute input key formed on the input surface.

In order to solve the above-mentioned problems, it is preferable that input units are respectively formed on front and rear surfaces of a case of an electronic apparatus so as to increase a total area of the input units. However, in an input device having a capacitive sensor according to the related art, there is a problem in that an input surface of the capacitive sensor is limited to any one of a front surface and a rear surface of the capacitive sensor. For this reason, in a case in which a double-sided input is required in the electronic apparatus, since there is no capacitive sensor in which the double-sided input can be performed using one capacitive sensor, one capacitive sensor should be disposed on each of the front and rear surfaces of the electronic apparatus.

SUMMARY OF THE INVENTION

The present invention has been finalized in view of the drawbacks inherent in the conventional antenna, and it is an object of the present invention to provide an input device having a double-sided-input-type capacitive sensor capable of detecting inputs from a front surface side and a rear surface side of one capacitive sensor in order to contribute to improvement of the operability of the input device and to a decrease in size of an electronic apparatus having the input device.

According to a first aspect of the invention, there is provided an input device which includes: a clock signal generator that generates a clock signal; a delay unit that has a capacitive sensor where an electrode is formed on a substrate; protective sheets each of which is formed of a dielectric and which are disposed on front and rear surfaces of the capacitive sensor; a logical product unit that transmits an output signal on the basis of a clock signal obtained from the clock signal generator and a delay signal obtained from the delay unit; and a controller that makes a predetermined program executed in accordance with an output signal obtained on the basis of the logical product unit.

Preferably, each of the protective sheets disposed on the front and rear surfaces of the capacitive sensor has a different thickness.

Preferably, the controller controls an input through the front and rear surfaces of the capacitive sensor on the basis of the output signal obtained from the capacitive sensor.

Preferably, the controller switches an input switching unit connected to the controller in accordance with a desired protective sheet, and controls whether an input is performed from which one of the protective sheets disposed on the rear and front surfaces of the capacitive sensor.

According to a second aspect of the invention, there is provided an electronic apparatus which includes: a capacitive sensor in which a detection electrode is formed on a film substrate; a first insulating sheet that is disposed so as to cover a front surface of the capacitive sensor; a second insulating sheet that is disposed so as to cover a rear surface of the capacitive sensor and has a different thickness from a thickness of the first insulating sheet; and an input device that is composed of a discrimination unit to discriminate between input operation on the first insulating sheet and input operation on the second insulating sheet. The input device is built in a case, and a detection signal output from the capacitive sensor at the time of performing input operation on the first insulating sheet is different from a detection signal output from the capacitive sensor at the time of performing input operation on the second insulating sheet.

Preferably, the discrimination unit discriminates an input operation side from a difference between detected capacitances that are generated from a difference between a first distance from a first insulating sheet surface and the detection electrode and a second distance from a second insulating sheet surface to the detection electrode.

According to a third aspect of the invention, there is provided an input device which includes: a capacitive coordinate detecting sensor in which an X electrode is formed on a front surface of a film substrate and a Y electrode is formed on a rear surface of the film substrate; a first insulating sheet that is disposed so as to cover an X electrode side of the capacitive coordinate detecting sensor; a switch member that is provided at the X electrode side of the film substrate and enters an on/off state through pressing operation of the first insulating sheet side; a second insulating sheet that is disposed so as to cover a rear surface of the switch member; and a discrimination unit that discriminates between input operation on the first insulating sheet and input operation on the second insulating sheet. In addition, a detection signal output from the capacitive sensor at the time of performing input operation on the first insulating sheet is different from a detection signal output from the capacitive sensor at the time of performing input operation on the second insulating sheet.

DESCRIPTION OF THE PREFERRED EMBODIMENT

Preferred embodiments (first and second embodiments) of an input device of the invention will now be described with reference to FIGS. 1 to 6.

First Embodiment

Hereinafter, a first embodiment of the invention will be described with reference to FIGS. 1 to 4.

Figure 1:
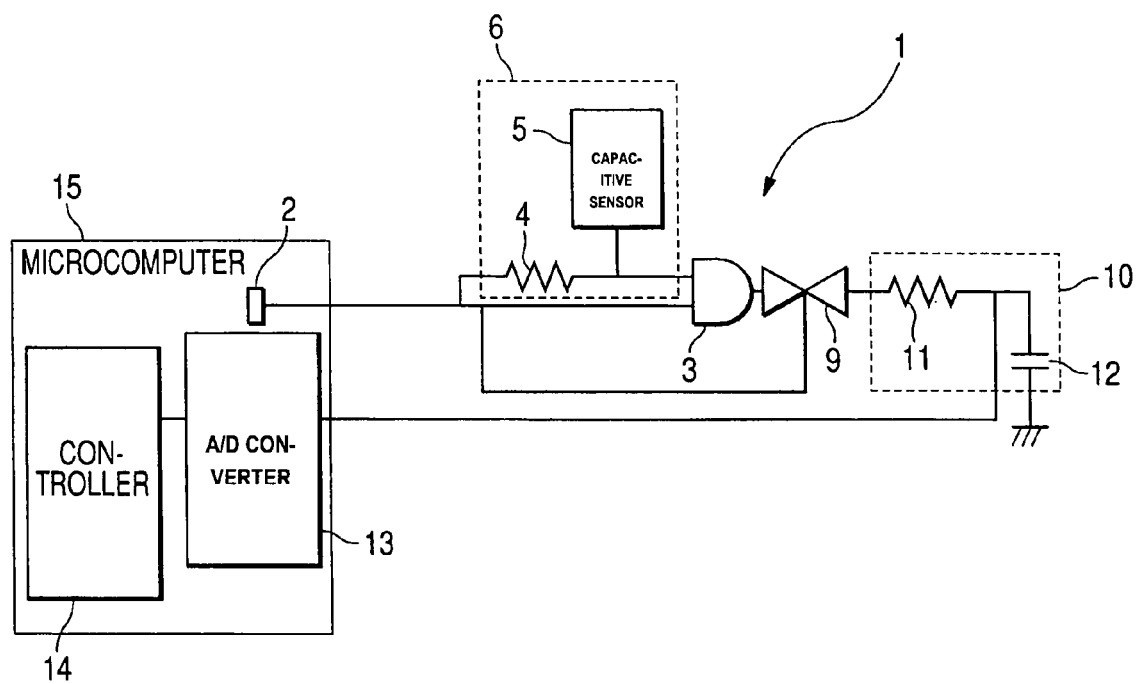
FIG. 1 is a circuit diagram of an input device according to a first embodiment of the invention.

As shown in FIG. 1, an input device 1 according to the first embodiment of the invention is an electronic circuit that includes a microcomputer 15, a delay unit 6, a logic product unit 3, an analog switch 9, and a smoothing unit 10.

The microcomputer 15 has a clock signal generator 2, an A/D converter 13, and a controller 14. The clock signal generator 2 generates a clock signal CK which becomes a driving wave of the input device 1 according to the present embodiment, and is connected to one input terminal of the logic product unit 3. The A/D converter 13 converts an analog output into a digital output and is connected to the smoothing unit 10 and the controller 14. The controller 14 selects any used program from a plurality of programs built in the microcomputer 15 and controls it. Any of the plurality of programs can be selected using a digital output transmitted from the A/D converter 13 as a determination reference.

The delay unit 6 has a resistor 4 and a capacitive sensor 5. The resistor 4 built in the delay unit 6 has one end connected between the clock signal generator 2 and the logic product unit 3 and the other end connected to the other input terminal of the logic product unit 3. In addition, the capacitive sensor 5 is connected between the resistor 4 and the logic product unit 3. The resistor 4 and the capacitive sensor 5 are used in forming a measuring electronic circuit that is called a CR circuit by the delay unit 6.

Figure 2:
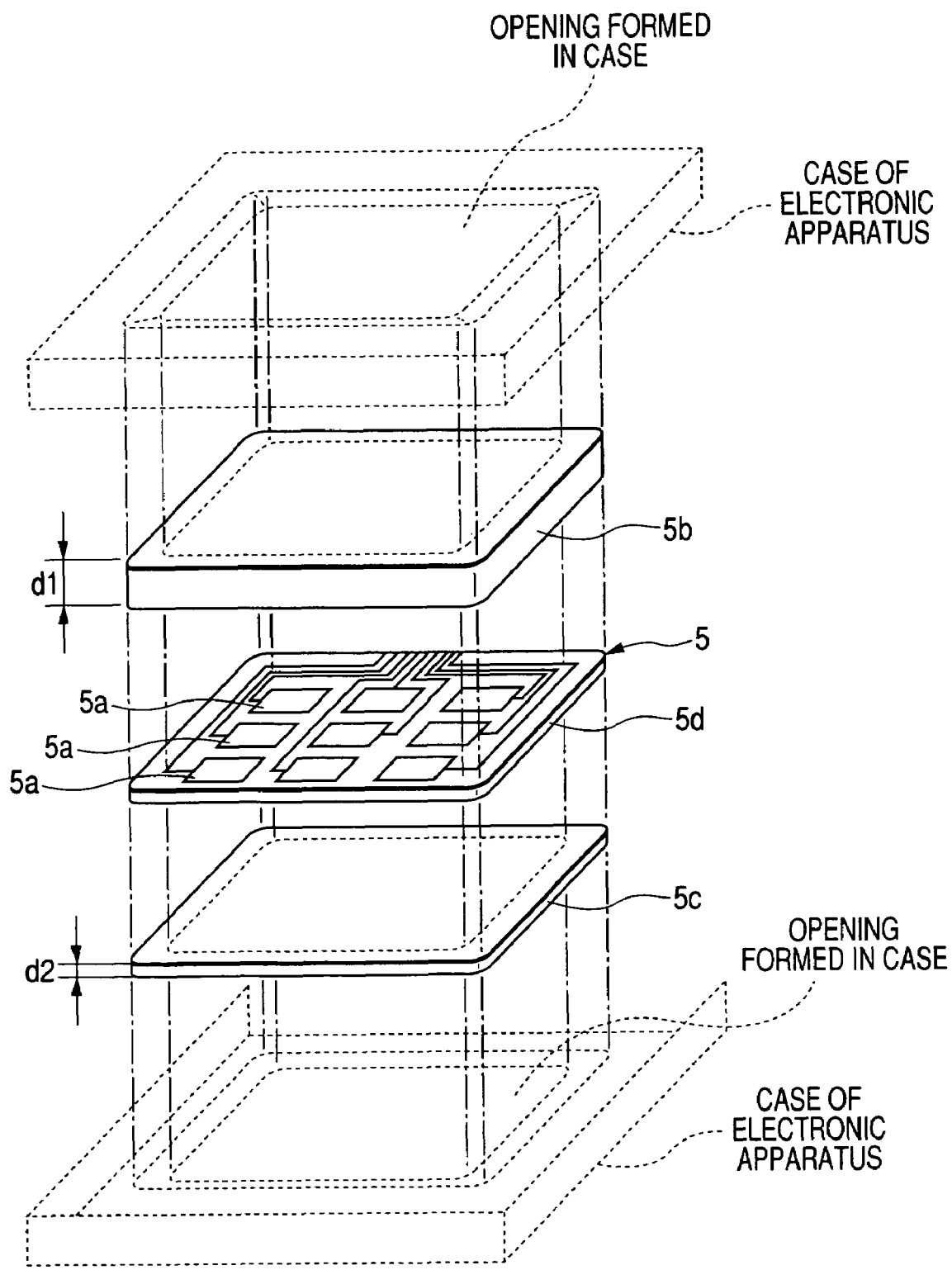
FIG. 2 is a perspective view illustrating a capacitive sensor, a front surface protective sheet, and a rear surface protective sheet provided in the input device according to the first embodiment of the invention.

As shown in FIG. 2, a capacitive sensor, which is formed by printing a plurality of electrodes 5a on a substrate 5d made of a film sheet, is used as the capacitive sensor 5. In the present embodiment, an active type or a passive type may be used as a type of a capacitive sensor used for the capacitive sensor 5. However, the passive-type capacitive sensor is preferably used in terms of reduction in size of the input device having the capacitive sensor 5, simplification of a structure, and reduction in a driving power.

In the electrode 5a, a terminal such as a metal or the like is used which has conductivity and can be formed in a circular shape, a rectangular shape, or any shape. In addition, for the electrode 5a, one electrode 5a or a plurality of electrodes 5a may be used, and are formed on the substrate 5d made of a material, such as plastic or the like, having an electrically insulating property.

A front surface protective sheet 5b and a rear surface protective sheet 5c each of which is formed of a dielectric are respectively disposed on a front surface and a rear surface of the capacitive sensor 5. Each of the front surface protective sheet 5b and the rear surface protective sheet 5c is formed in a planar shape with a uniform thickness. However, a thickness d1 of the front surface protective sheet 5b and a thickness d2 of the rear surface protective sheet 5c are different from each other. In the first embodiment, the front surface protective sheet 5b and the rear surface protective sheet 5c of the capacitive sensor 5 are formed such that the thickness d1 of the front surface protective sheet 5b is larger than the thickness d2 of the rear surface protective sheet 5c. In addition, the thickness of each of the front and rear surface protective sheets 5b and 5c may be selected within a range of 0.15 to 3.0 mm in consideration of a thickness of a case of an electronic apparatus where the input device of the invention is disposed and input sensitivity of the capacitive sensor. However, if each of the protective sheets 5b and 5c has a thickness larger than the thickness of 1.5 mm, since the sensitivity of the capacitive sensor 5 is lowered, it is preferable that it have a thickness equal to or smaller than a thickness of 1.5 mm.

Figure 3:
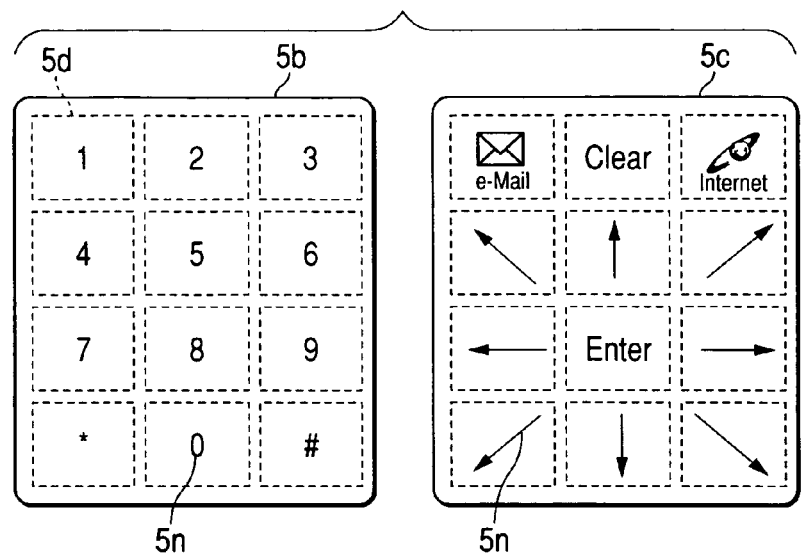
FIG. 3 is a plan view illustrating figures or the like formed on surfaces of the front surface protective sheet and the rear surface protective sheet provided in the input device according to the first embodiment of the invention.

Specifically, figures, characters, arrows, or the like (hereinafter, referred to as 'FIG. 5n'), which are required when an input is performed with respect to the input device according to the present embodiment, are formed on the front surface protective sheet 5b and the rear surface protective sheet 5c, as shown in FIG. 3. The FIG. 5n are formed at locations where arrangement locations of the electrodes 5a included in the capacitive sensor 5 correspond to arrangement locations of the FIG. 5n, respectively. In addition, the front surface protective sheet 5b and the rear surface protective sheet 5c may be used without forming the FIG. 5n or the like on the front surface protective sheet 5b and the rear surface protective sheet 5c as in a pointing device in a notebook computer.

The logical product unit 3 is an AND circuit for performing logical product (AND). As shown in FIG. 1, in the first embodiment, the logical product unit 3 uses an AND gate that has two input terminals and one output terminal. In the two input terminal of the logical product unit 3, one input terminal is connected to the clock signal generator 2, and the other input terminal is connected to one end of the delay unit 6. In addition, the output terminal of the logical product unit 3 is connected to the input terminal of the analog switch 9.

The analog switch 9 is a switch that switches between transmission and cutoff of the analog signal and can use a conventional analog switch 9. The analog switch 9 has an analog switch control unit (not shown) that controls switching operation of the analog switch 9 together with a clock signal CK obtained from the clock signal generator 2. In addition, the output terminal of the analog switch 9 where the logical product unit 3 is not connected is connected to the input terminal of the smoothing unit 10.

The smoothing unit 10 is a unit that smoothes an alternating current, and uses a smoothing circuit composed of a resistor 11 and a capacitor 12. An output terminal of the smoothing unit 10 where the analog switch 9 is not connected is connected to the A/D converter 13 installed in the microcomputer 15.

Next, effects of the input device according to the first embodiment will be described.

Figure 4:
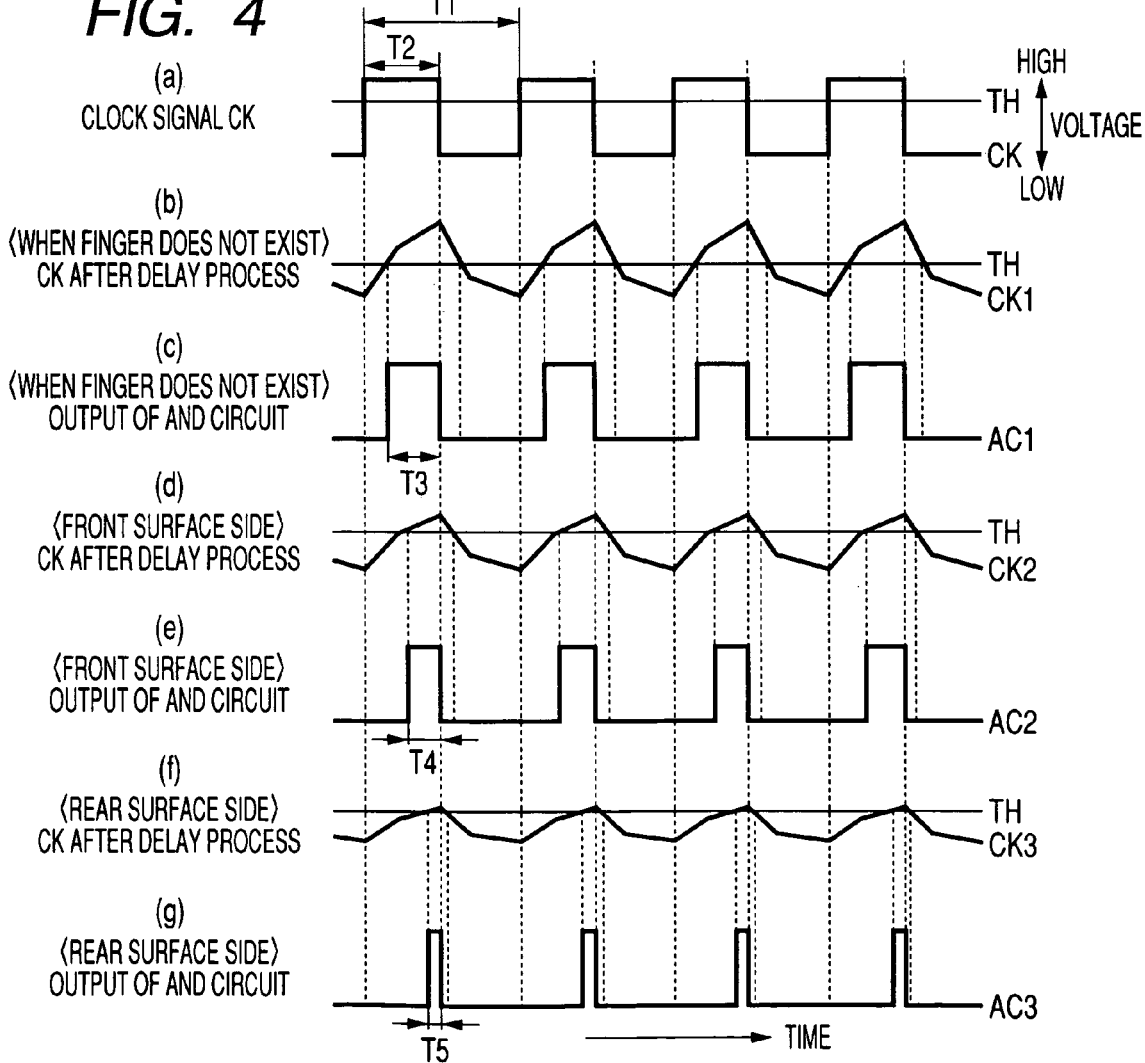
FIG. 4 is a timing chart illustrating a clock signal obtained from the circuit of the input device according to the first embodiment of the invention.

The clock signal generator 2 of the microcomputer 15, which is included in the input device according to the first embodiment, outputs a clock signal CK composed of a regular pulse having a predetermined frequency to the logical product unit 3 and the delay unit 6, as shown in (a) of FIG. 4. The clock signal CK, which is directly output from the clock signal generator 2 to the logical product unit 3, is input to the logical product unit 3 without changing a waveform of the clock signal CK. In addition, the clock signal CK, which passes through the delay unit 6 from the clock signal generator 2, is subjected to a delay process through the delay unit 6, and is then input to the logical product unit 3.

The delay process can be divided into the following three cases of delay types: a case in which a difference between the thickness d1 of the front surface protective sheet 5b and the thickness d2 of the rear surface protective sheet 5c is set in the capacitive sensor 5, and thus a conductor such as a finger of a human body or the like does not come into contact with any one of the protective sheets 5b and 5c respectively disposed on the front and rear surfaces of the capacitive sensor 5 (hereinafter, referred to as 'a case in which there is no finger on the capacitive sensor 5'); a case in which the conductor such as the finger of the human body or the like comes into contact with the front surface protective sheet 5b disposed on the capacitive sensor 5 (hereinafter, referred to as 'a case in which there is a finger on the front surface protective sheet 5b'); and a case in which the conductor such as the finger of the human body or the like comes into contact with the rear surface protective sheet 5c disposed on the capacitive sensor 5 (hereinafter, referred to as 'a case in which there is a finger on the rear surface protective sheet 5c').

In the case in which there is no finger on the capacitive sensor 5, the clock signal CK, which is output to the delay unit 6, is subjected to a delay process from the clock signal of a rectangular waveform (rectangular wave) shown in (a) of FIG. 4 to a clock signal CK1 of a substantially triangular waveform (triangular wave) shown in (b) of FIG. 4. In addition, the logical product unit 3 to which the clock signals CK and CK1 are input classifies values of the input clock signals CK and CK1 on the basis of a threshold value TH illustrated in FIGS. 4A and 4B with an H level having a value larger than the threshold value TH and an L level having a value smaller than the threshold value TH, and outputs to the analog switch 9 an AND signal AC1 which is logical product obtained from the values of the clock signals CK and CK1 in an H level, as shown in (c) of FIG. 4. A pulse width of the AND signal AC1 becomes T3.

In the meantime, in the case in which there is a finger on the front surface protective sheet 5b, the clock signal CK, which is output to the delay unit 6, is different from the triangular wave shown in (b) of FIG. 4, and is subjected to the delay process so as to become the clock signal CK2 of the triangular wave shown in (d) of FIG. 4. The clock signal CK2 of the triangular wave shown in (d) of FIG. 4 has the same bottom length as the clock signal CK1 of the triangular wave shown in (b) of FIG. 4, but has a smaller height than the clock signal CK1 of the triangular wave shown in (b) of FIG. 4. Thereby, since a time for which a voltage becoming larger than the threshold value TH shown in (d) of FIG. 4 is continuous is shortened, the pulse width T4 of the AND signal AC2 shown in (e) of FIG. 4 becomes smaller than the pulse width T3 of the AND signal AC1 shown in (c) of FIG. 4.

In the same manner as the case in which there is a finger on the front surface protective sheet 5b, in the case in which there is a finger on the rear surface protective sheet 5c, the clock signal CK of the rectangular shape becomes the clock signal CK3 of the triangular wave, as shown in (f) of FIG. 4. As a result, as shown in (g) of FIG. 4, the logical product unit 3 outputs an AND signal AC3 having a pulse width T5.

Due to the thickness d1 of the front surface protective sheet 5b disposed on the front surface of the capacitive sensor 5 is larger than the thickness d2 of the rear surface protective sheet 5c disposed on the rear surface of the capacitive sensor 5, a relationship among the pulse widths T3, T4, and T5 satisfies the condition T3>T4>T5. The difference between the pulse widths T3, T4, and T5 results from the difference between the waveforms of the clock signals CK1, CK2, and CK3 of the triangular waves. The waveforms of the clock signals CK1, CK2, and CK3 of the triangular waves vary when a time constant T of the RC circuit formed by the delay unit 6 varies.

In this case, the time constant T is represented by a relationship that is obtained from the product between a resistance R of the resistor 4 and a capacitance C of the capacitive sensor 5 included in the delay unit 6, that is, T=RC (Equation 1), and the capacitance C is represented by a relationship among a dielectric constant e of the protective sheet 5b or 5c, an area S of the protective sheet 5b or 5c which a finger of a human body or the like comes into contact with, and a distance d between the capacitive sensor 5 and the finger opposite to the capacitive sensor 5, that is, C=e(S/d) (Equation 2).

$$T=RC \qquad \text{[Equation 1]}$$

$$C=e(S/d) \qquad \text{[Equation 2]}$$

In addition, since the resistance R of the resistor 4 is constant, the time constant T is proportional to the capacitance C. In addition, since the dielectric constant e is constant, the capacitance C is proportional to the area S of the protective sheet 5b or 5c which the finger of the human body or the like comes into contact with, and the reciprocal 1/d of the distance d between the capacitive sensor 5 and the finger opposite to the capacitive sensor 5.

That is, the capacitance C varies in accordance with the variation of the area S of the protective sheet 5b or 5c which the finger of the human body or the like comes into contact with and the variation of the reciprocal 1/d of the distance d between the capacitive sensor 5 and the finger opposite to the capacitive sensor 5. Therefore, it is possible to recognize whether an input with respect to the capacitive sensor 5 is performed and whether an input is performed from which protective sheet of the front surface protective sheet 5b and the rear surface protective sheet 5c.

In addition, the analog switch 9 is provided between the logical product circuit 3 and the smoothing unit 10 and the analog switch 9 and the clock signal generator 2 are integrally operated, so that it is possible to control a charged or discharged electric charge to the capacitive sensor 5. For this reason, a voltage, which each of the clock signals CK1, CK2, and CK3 having been subjected to the delay process by the capacitive sensor 5 indicates, increases as a whole, and a time for which a voltage larger than the threshold value TH is continuous is lengthened. Accordingly, the pulse widths T3, T4, and T5 become widened as a whole, and an analog output value obtained from the smoothing unit 10 increases as a whole. If the analog output value increases, since the controller 14 for detecting the analog output value can determine a difference between the output values obtained from the difference between the input surfaces with ease and accuracy, it is possible to improve detection precision of the capacitive sensor 5. That is, it is possible to recognize whether an input is performed from either the front surface protective sheet 5b or the rear surface protective sheet 5c without misrecognition.

That is, the controller 14 clearly determines the difference among the clock signals CK1, CK2, and CK3 having been subjected to the different delay processes depending on input types on the capacitive sensor 5. Then, the controller 14 controls the program executed in accordance with the input type, so that the input device according to the first embodiment becomes an input device in which an input can be performed from both surfaces of the front surface protective sheet 5b and the rear surface protective sheet 5c.

Second Embodiment

Figure 5:
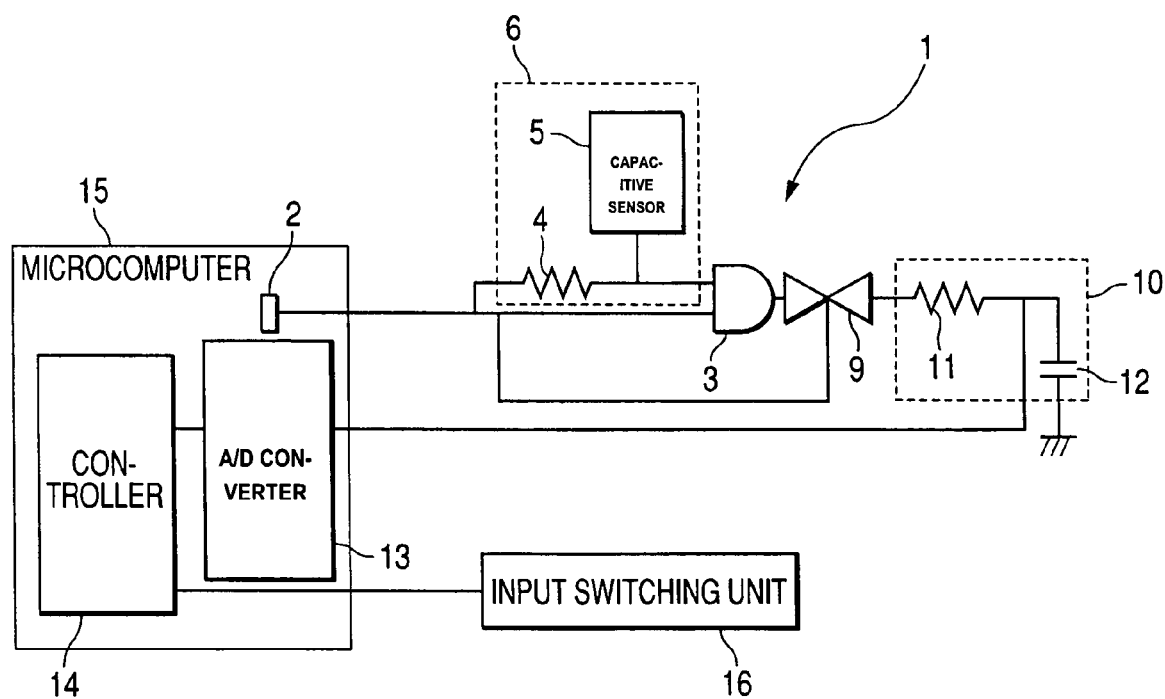
FIG. 5 is a circuit diagram of an input device according to a second embodiment of the invention.
Figure 6:
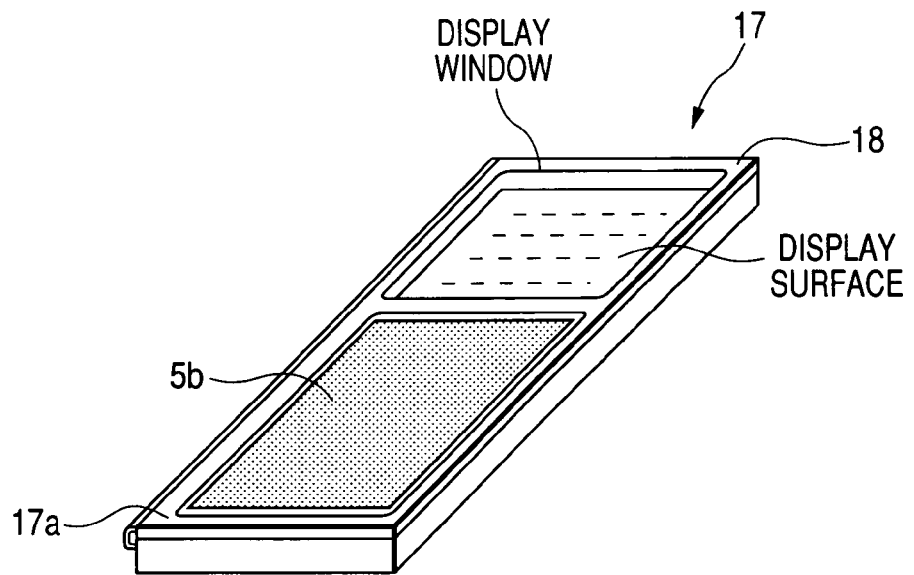
FIG. 6 is a conceptual perspective view of an input unit having a capacitive sensor provided in the input device according to the second embodiment of the invention.
Figure 6:
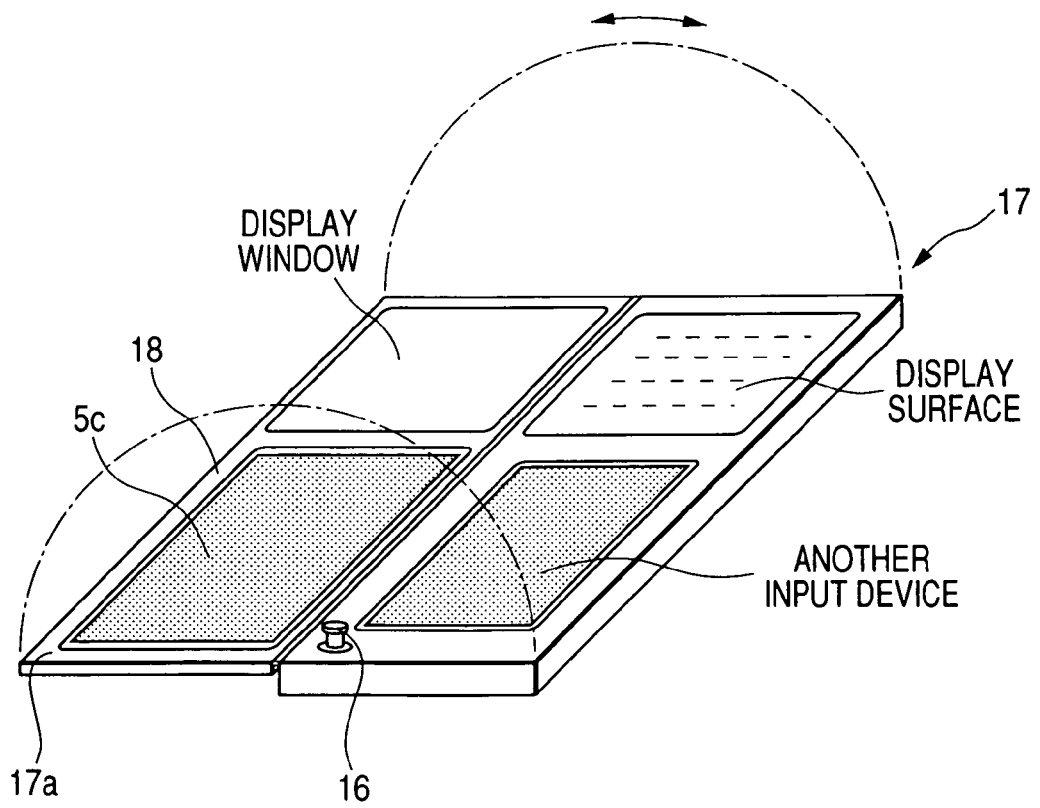

Hereinafter, a second embodiment of the invention will be described with reference to FIGS. 5 and 6. As shown in FIG. 5, since the input device 1 according to the second embodiment has the approximately same structure and effect as the input device according to the first embodiment, only a portion of the input device according to the second embodiment different from the input device according the first embodiment will be described.

Similarly to the input device 1 according to the first embodiment, the input device 1 according to the second embodiment is an electronic circuit that includes a microcomputer 15, a delay unit 6, a logical product unit 3, an analog switch 9, and a smoothing unit 10. However, the input device 1 according to the second embodiment is different from the input device according to the first embodiment in a thickness of each of protective sheets 5b and 5c of a capacitive sensor 5 provided in the delay unit 6, and an input switching unit 16 connected to a controller 14 provided in the microcomputer 15.

The thickness of each of the protective sheets 5b and 5c of the second embodiment is different from that of the first embodiment. That is, the thickness d1 of the front surface protective sheet 5b may be equal to the thickness d2 of the rear surface protective sheet 5c.

The input switching unit 16 uses a switch that switches whether an input is performed from either the front surface protective sheet 5b or the rear surface protective sheet 5c. For example, as shown in FIG. 6, the input switching unit 16 corresponds to a flap portion opening/closing input switching unit for detecting whether flap portion 18 is opened or closed in a flap portion 18 provided in a remote controller 17 for operating an air conditioner, an opening/closing input switching unit provided at a hinge portion in order to recognize whether a cellular phone is opened or closed in the cellular phone in which two portions can be folded in one portion, or the like. In addition, the input switching unit 16 can be integrally controlled with a program executed by the controller 14. For example, the input switching unit 16 is a switching unit that allows a different program to be executed with respect to each of the front surface protective sheet and the rear surface protective sheet, such that a program A is executed when the input is performed from the front surface protective sheet 5b and a program B is executed when the input is performed from the rear surface protective sheet 5c.

In the input device according to the second embodiment formed in this way, even when it is formed such that it is not possible to detect whether an input is performed from either the front surface protective sheet 5b or the rear surface protective sheet 5c by means of only the capacitive sensor 5, it is possible to detect whether an input is performed from either the front surface protective sheet 5b or the rear surface protective sheet 5c by means of the input switching unit 16 connected to the controller 14, and it is possible to select the executed program on the basis of the result obtained by detecting whether an input is performed from either the front surface protective sheet 5b or the rear surface protective sheet 5c.

According to the first and second embodiments of the invention, the input device is built in a case of the remote controller 17, and the front surface protective sheet 5b is provided so as to be exposed to the front surface side 17a of the remote controller 17 and the rear surface protective sheet 5c is provided so as to be exposed to the rear surface side 17b of the remote controller 17. A finger or the like comes into contact with the surfaces of the front surface protective sheet 5b and the rear surface protective sheet 5c so as to move thereon, so that different input operation may be performed.

Alternatively, the front surface protective sheet 5b and the rear surface protective sheet 5c may be not exposed to the outside of the case, but may be provided in the case of the remote controller 17. In addition, the finger or the like comes into contact with the case surface near the front surface protective sheet 5b or the case surface near the rear surface protective sheet 5c so as to move thereon, so that different input operation may be performed.

Figure 7:
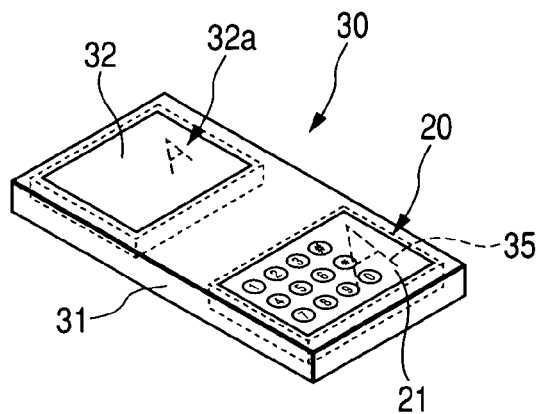
FIG. 7 is a diagram illustrating a case in which an input device according to a third embodiment of the invention is installed in a personal digital assistant.
Figure 8:
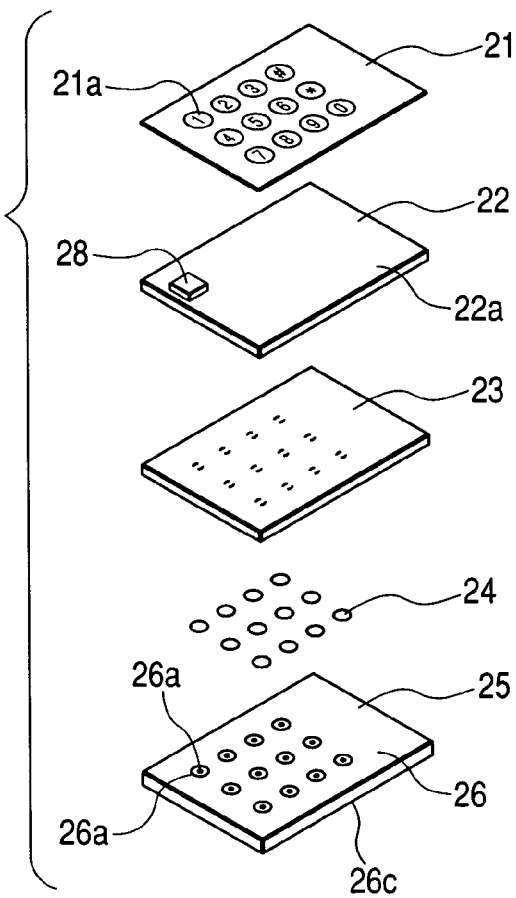
FIG. 8 is an exploded perspective view of the input device according to the third embodiment of the invention.
Figure 9:
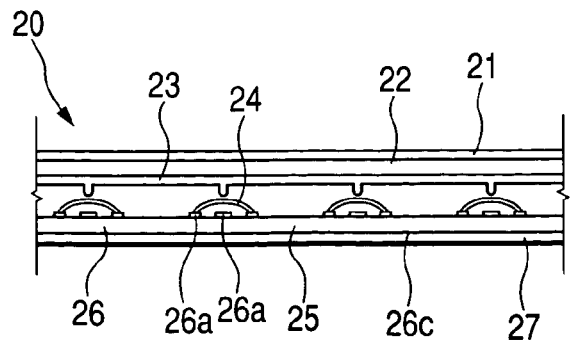
FIG. 9 is a cross-sectional view of the input device according to the third embodiment of the invention.

Next, an input device according to a third embodiment of the invention will be described with reference to FIGS. 7 to 9. The input device 20 according to the third embodiment includes a display member 21 on which figures, characters or the like are displayed, a capacitive coordinate detecting sensor 22, a push sheet 23 having protrusions, and a switch member 25 having dome-shaped inversion contacts 24, which are sequentially laminated.

The display member 21 is composed of an insulating sheet member, and instruction portions 21a, such as figures, characters, symbols, or the like, are printed on a surface of the display member 21. Each of the dome-shaped inversion contacts 24 is provided at a location corresponding to each of the instruction portions 21a. An operator presses his finger on the instruction operation 21a or depresses his finger on the instruction portion 21a, so that the input device is switched on or switched off by the dome-shaped inversion contact 24 and the fixed contact 26a of the switch substrate 26.

The coordinate detecting sensor 22 is a capacitive sensor. In the coordinate detecting sensor 22, a plurality of X electrodes are formed on a front surface of the film substrate 22a in parallel to each other, and a plurality of Y electrodes are formed on the rear surface of the film substrate 22a at a right angle with respect to the X electrodes in parallel to each other. The X and Y electrodes are alternately applied with a driving signal, the capacitance value varies depending on whether the finger of the operator exists or in accordance with a distance between the finger and the capacitive sensor, so that coordinates such as the contacting position of the finger can be detected. If the finger comes into contact with the surface of the display member 21 and the input operation is performed, the coordinate detecting sensor 22 outputs a coordinate position detecting signal in accordance with a moving trace of the finger or the like from the variation of the capacitance. In addition, if the finger comes into contact with the rear surface 26c of the switch substrate 26 and the input operation is performed, the coordinate detecting sensor 22 outputs a coordinate position detecting signal in accordance with a moving trace of the finger or the like from the variation of the capacitance. Further, an insulating sheet 27 may be disposed on the rear surface of the switch substrate 26.

The coordinate position signal is output from an IC controller 28 connected to the X electrode and the Y electrode of the film substrate 22a.

In the case in which the finger or the like comes into contact with the surface of the display member 21 and the input operation is performed and in the case in which the finger or the like comes into contact with the rear surface 26c of the switch substrate 26 and the input operation is performed, since the distance D1 between the finger and the coordinate detecting sensor 22 is different from the distance D2 between the finger and the coordinate detecting sensor 22, the controller 28 discriminates whether the input operation is performed from either the surface of the display member 21 or the rear surface 26c of the switch substrate 26 on the basis of the difference between the capacitances, and outputs the different detecting signal with respect to each surface. The different detecting signal is output with respect to each surface, so that one coordinate detecting sensor 22 can be commonly used, which results in achieving input operation of both surfaces. The distances D1 and D2 may be selected within a range of from 0.15 to 3.0 mm in consideration of the sensitivity of the coordinate detecting sensor, and are preferably not more than 1.5 mm.

The input device 20 is built in the case 31 of a personal digital assistant 30 or a remote controller. The input device 20 is switched on by pressing on the instruction portion 21a of the display member 21, and display such as pressed figures, characters or the like is performed on the screen display unit 32. In addition, the finger comes into contact with the surface of the display member 21, and the input operation and the moving operation (35) are performed, so that trace display 329 is performed in accordance with the display cursor movement of the screen display unit 32 or moving trace 35 such as the finger.

Further, the finger comes into contact with the rear surface 26c of the switch substrate 26 or the surface of the insulating sheet 27, and the input operation and the moving operation are performed. The screen of the screen display unit 32 is switched or scrolled.

Furthermore, the rear surface 26c of the switch substrate 26 or the surface of the insulating sheet 27 may be exposed to the outside of the case or may be provided near the surface of the case.

That is, according to the embodiments of the invention, since the controller 14 of the input device can recognize whether an input is performed from either the front surface protective sheet 5b or the rear surface protective sheet 5c disposed on one capacitive sensor without erroneous operation, it contributes to the improvement in the operability of the input device and a decrease in size of the electronic apparatus having the input device.

The invention is not limited to the above-mentioned embodiments, but various modifications and changes can be made if necessary.

According to some aspects of the invention, since it is possible to detect the input performed from the front surface side and the rear surface side of one capacitive sensor without erroneous operation, it contributes to the improvement in the operability of the input device and a decrease in size of the electronic apparatus having the input device.

The invention claimed is:

1. An input device comprising:
    a clock signal generator that generates a clock signal;
    a delay unit that has a capacitive sensor where an electrode is formed on a substrate;
    protective sheets each of which is formed of a dielectric and which are disposed on front and rear surfaces of the capacitive sensor;
    a logical product unit that transmits an output signal on the basis of the clock signal obtained from the clock signal generator and a delay signal obtained from the delay unit; and
    a controller that makes a predetermined program executed in accordance with an output signal obtained on the basis of the logical product unit.

2. The input device according to claim 1,
    wherein each of the protective sheets disposed on the front and rear surfaces of the capacitive sensor has a different thickness.

3. The input device according to claim 1,
    wherein the controller controls inputs from the front and rear surfaces of the capacitive sensor on the basis of the output signal obtained from the capacitive sensor.

4. The input device according to claim 1,
    wherein the controller switches an input switching unit connected to the controller in accordance with a desired protective sheet, and controls whether an input is performed from which one of the protective sheets disposed on the rear and front surfaces of the capacitive sensor.

5. An electronic apparatus comprising:
    a capacitive sensor in which a detection electrode is formed on a film substrate;
    a first insulating sheet that is disposed so as to cover a front surface of the capacitive sensor;
    a second insulating sheet that is disposed so as to cover a rear surface of the capacitive sensor and has a different thickness from a thickness of the first protective sheet; and
    an input device that is composed of a discrimination unit to discriminate between input operation on the first insulating sheet and input operation on the second insulating sheet,
    wherein the input device is built in a case, and
    a detection signal output from the capacitive sensor at the time of performing input operation on the first insulating sheet is different from a detection signal output from the capacitive sensor at the time of performing input operation on the second insulating sheet.

6. The electronic apparatus according to claim 5,
    wherein in the input device, the first insulating sheet is provided near one surface of the case and the second insulating sheet is provided near an opposing surface of the case.

7. The electronic apparatus according to claim 5,
    wherein in the input device, the first insulating sheet is provided to be exposed to another surface of the case and the second insulating sheet is provided to be exposed to the other surface of the case.

8. The electronic apparatus according to claim 5,
    wherein the discrimination unit discriminates an input operation side from a difference between detected capacitances that are generated from a difference between a first distance from a first insulating sheet surface and the detection electrode and a second distance from a second insulating sheet surface to the detection electrode.

9. An input device comprising:

a capacitive coordinate detecting sensor in which an X electrode is formed on a front surface of a film substrate and a Y electrode is formed on a rear surface of the film substrate;

a first insulating sheet that is disposed so as to cover the X electrode side of the capacitive coordinate detecting sensor;

a switch member that is provided at the Y electrode side of the film substrate and enters an on/off state through pressing operation of the first insulating sheet side;

a second insulating sheet that is disposed so as to cover a rear surface of the switch member; and a discrimination unit that discriminates between input operation on the first insulating sheet and input operation on the second insulating sheet, wherein a detection signal output from the capacitive sensor at the time of performing input operation on the first insulating sheet is different from a detection signal output from the capacitive sensor at the time of performing input operation on the second insulating sheet.

10. The electronic apparatus according to claim 9, wherein the discrimination unit discriminates an input operation side from a difference between detected capacitances that are generated from a difference between a first distance from a first insulating sheet surface and the X electrode and a second distance from a second insulating sheet surface to the Y electrode with the switch member interposed therebetween.

* * * * *